United States Patent [19]

Wu

[11] Patent Number: 5,139,257
[45] Date of Patent: Aug. 18, 1992

[54] GOLF BAG MOUNTING STRUCTURE

[76] Inventor: Ching-Chang Wu, No. 35-1, Jih Hsin Street, Tu Cheng Hsiang, Taipei, Taiwan

[21] Appl. No.: 749,359

[22] Filed: Aug. 23, 1991

[51] Int. Cl.⁵ .............................................. A63B 55/00
[52] U.S. Cl. ............................. 273/32 E; 206/315.7; 248/96
[58] Field of Search .................... 273/32 E; 248/96; 206/315.3, 315.6, 315.7

[56] References Cited

U.S. PATENT DOCUMENTS

| 1,475,605 | 11/1923 | Smith | 206/315.3 X |
| 2,422,298 | 6/1947 | Freis | 248/96 X |
| 2,580,533 | 5/1971 | Nordland | 248/96 |
| 2,854,244 | 9/1958 | Jarman | 248/96 X |
| 2,902,238 | 9/1959 | Tolman | 248/96 |
| 3,051,505 | 8/1962 | Flanagan | 248/96 X |

Primary Examiner—William H. Grieb
Attorney, Agent, or Firm—Varndell Legal Group

[57] ABSTRACT

A golf bag mounting structure comprising a loop-like top panel detachably secured to a golf cart's main frame by a connector, a cap-like bottom panel having a side frame detachably secured to the golf cart's main frame, and an intermediate panel detachably connected between the top and bottom panels and incorporated therewith forming into a golf bag. The intermediate panel is made from a rectangular sheet of flexible material having two opposite end edges connected together by a zip fastener and two opposite side edges respectively connected to the top and bottom panels by two zip fasteners.

1 Claim, 3 Drawing Sheets

GOLF BAG MOUNTING STRUCTURE

BACKGROUND AND SUMMARY OF THE INVENTION

The present invention relates to a golf bag mounting structure and relates more particularly to a golf bag releasably fastened in a golf cart's main frame for carrying golf clubs and the related equipment.

In golf courses, golf carts are commonly used for carrying golf bags. Because golf bags are separately provided, it is difficult to fasten a golf bag in the main frame of a golf cart. When a golf bag is attached to a golf cart, it may fall from place easily while moving. The present invention has been accomplished to eliminate this problem. It is therefore the main object of the present invention to provide a golf bag mounting structure which has means to secure a golf bag to a golf cart firmly.

DETAILED DESCRIPTION OF THE PREFERRED EMBODIMENT

Figure 1:
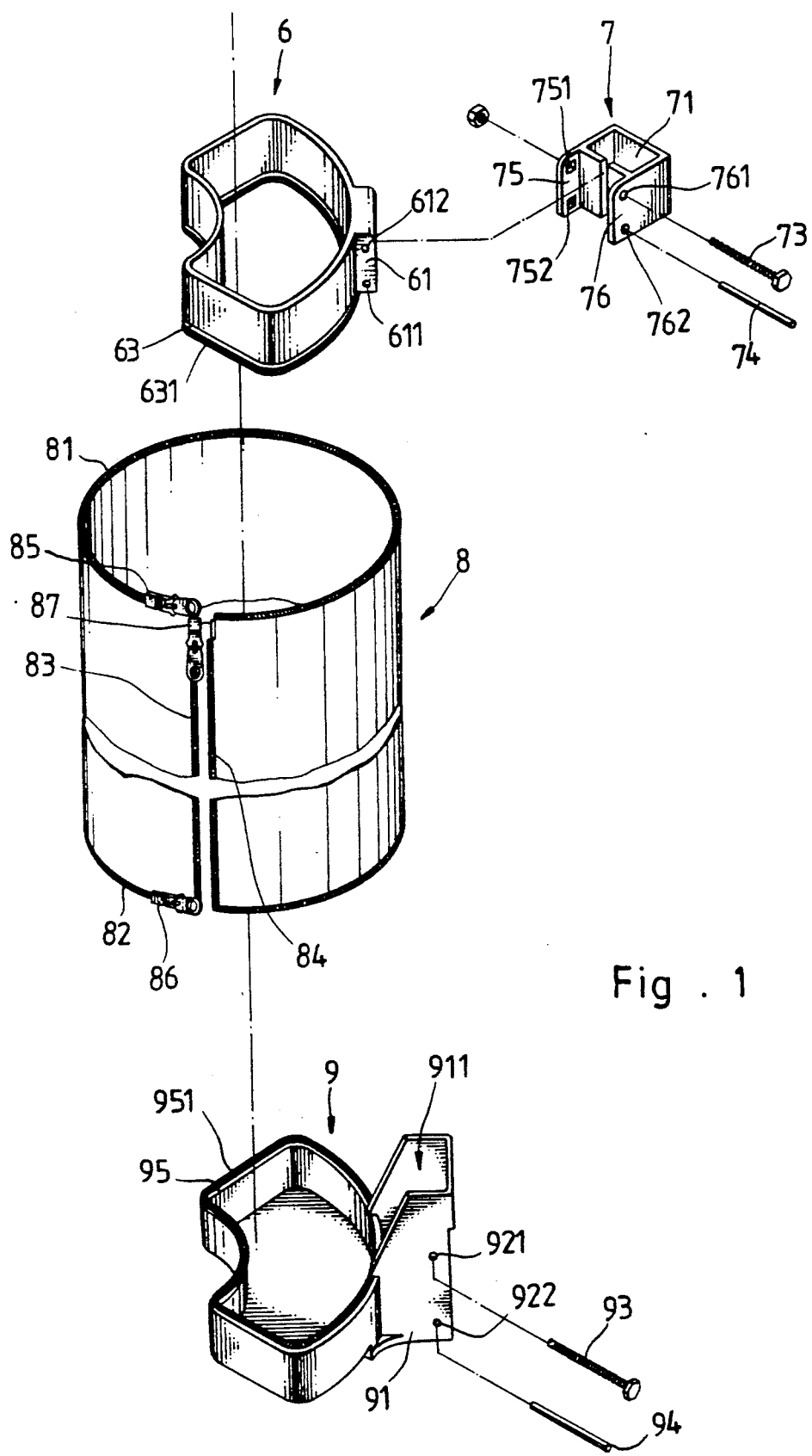
FIG. 1 is an exploded perspective view of the present invention.

Referring to the annexed drawings in detail, therein illustrated is the preferred embodiment of the golf bag mounting structure of the present invention which is generally comprised of a top panel 6, a bottom panel 9, an intermediate panel 8, and a connector 7.

The top panel 6 is made in a loop-like structure having a row of interlocking taps 631 around the bottom edge 63 thereof and a unitary connecting block 61 on the peripheral surface thereof, which connecting block 61 has two through-holes 611 and 612 spaced from each other. The connector 7 has a rectangular opening 71 for mounting on the main frame 101 of a golf cart 10, two parallel side walls 75 and 76 bilaterally projecting from said rectangular opening 71, which parallel side walls 75 and 76 each has two through-holes 751 and 752 or 761 and 762 corresponding to the two through-holes 611 and 612 on the connecting block 61 of the top panel 6. By means of the rectangular opening 71, the connector 7 is secured to the main frame 101 of the golf cart 10. After the connector 7 has been fastened in the main frame 101 of the golf cart 10, the connecting block 61 of the top panel 6 is inserted in between the two parallel said walls 75 and 76 of the connector 7 with the through-holes 611 and 612 thereon respectively aligned with the through-holes 751 and 761 and the through-holes 752 and 762 for fastening a screw 73 and a pin 74. By fastening the screw 73 and the pin 74, the top panel 6 and the connector 7 are firmly secured to the main frame 101 of the golf cart 10.

The intermediate panel 8 is made from a sheet of flexible material having a plurality of rows of interlocking taps 81, 82, 83 and 84 made around the two opposite side edges and the two opposite end edges thereof. By joining the rows of interlocking taps 83 and 84 on the two opposite ends through the operation of a first sliding cam 87, the two opposite ends of the intermediate panel 8 are connected together, and therefore, the intermediate panel 8 is formed into a cylindrical structure. By joining the row of interlocking taps 81 on one side edge of the intermediate panel 8 with the interlocking taps 631 on the bottom edge 63 of the top panel 6 through the operation of a second sliding cam 85, the intermediate panel 8 is secured to the top panel 6.

The bottom panel 9 is made in a cap-like structure having a row of interlocking taps 951 around the top edge 95 thereof and a unitary side frame 91 at one side. The side frame 91 defines therein an elongated slot 911 through which it is mounted on the main frame 101 of the golf cart 10, and has two spaced through-holes 921 and 922 through which a screw 93 and a pin 94 are inserted to firmly secure the bottom panel 9 to the main frame 101 of the golf cart 10. By joining the row of interlocking taps 951 on the top edge 95 of the bottom panel 9 with the row of interlocking taps 82 of the other side edge of the intermediate panel 8, the intermediate panel 8 is secured to the bottom panel 9.

Figure 2:
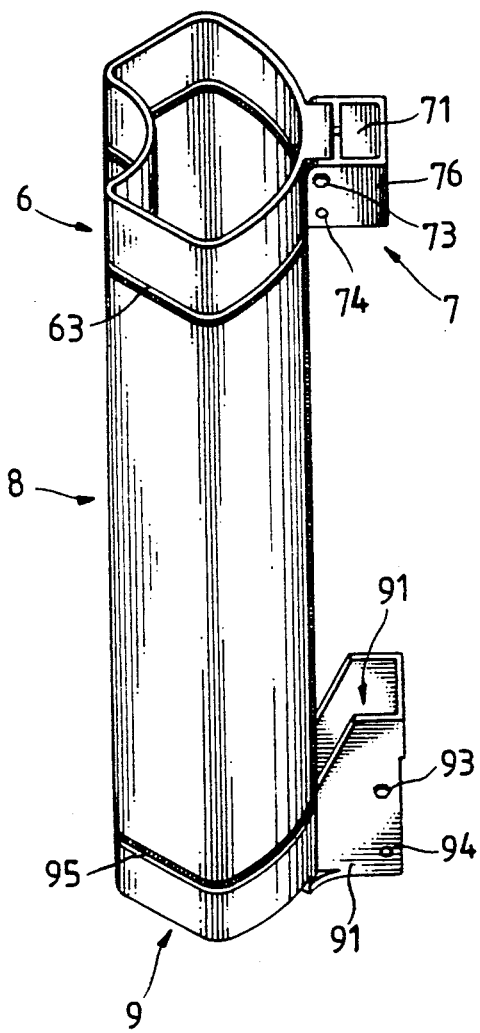
FIG. 2 is a perspective assembly view thereof.
Figure 3:
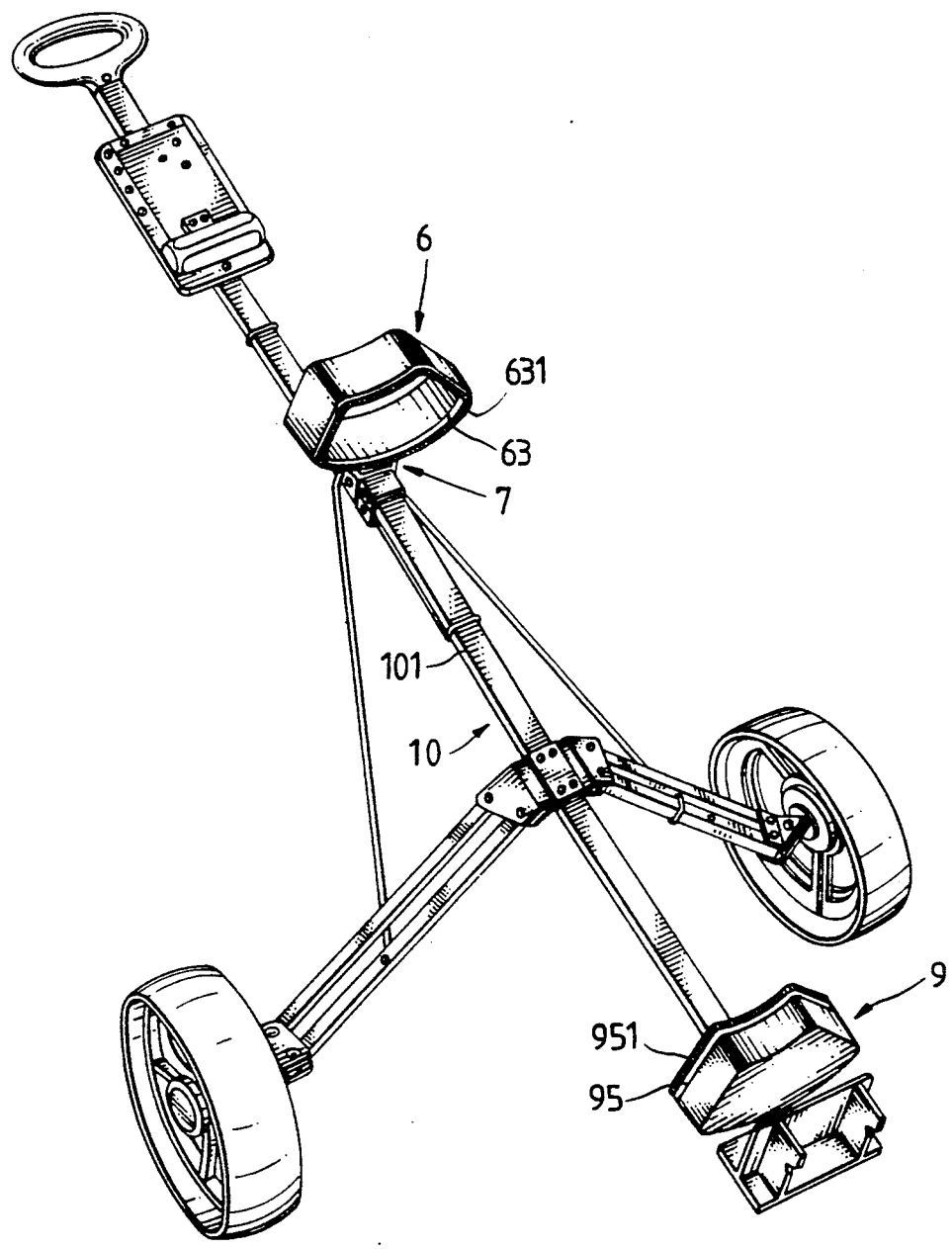
FIG. 3 illustrates that the top and bottom panels are respectively fastened in the main frame on a golf cart at two opposite ends.

By joining the rows of interlocking tape 631, 81, 82, 83, 84 and 951 respectively, the top panel 6, the intermediate panel 8 and the bottom panel 9 are connected into a golf bag, as shown in FIG. 2, for carrying golf clubs and the related equipment. By separating the rows of interlocking taps 631, 81, 82 and 951, the intermediate panel 8 can be removed from the top panel 6 and the bottom panel 9 for wash or replacement. By removing the screws 73 and 93 and the pins 74 and 94, the top and bottom panels 6 and 9 can be conveniently detached from the golf cart 10. By loosening the screws 73 and 93, the connector 7 and the bottom panel 9 can be rotated on the pins 74 and 94 and collapsed onto the main frame 101 of the golf cart 10 respectively.

I claim:

1. A golf bag mounting structure comprising:

a top panel in a loop-like structure having a row of interlocking taps around the bottom edge thereof and a unitary connecting block on the peripheral surface thereof, said connecting block having two through-holes spaced from each other;

a connector for securing said top panel to a golf cart's main frame, said connector having a rectangular opening for mounting on said golf cart's main frame and two parallel side walls bilaterally projecting from said rectangular opening for holding said connecting block of said top panel, said two parallel side walls each having two through-holes aligned with the two through-holes on said connecting block and fastened in position by a screw and a pin;

an intermediate panel made from a rectangular sheet of flexible material having two opposite side edges and two opposite end edges, said two opposite side edges each being attached with a row of interlocking taps, said two opposite end edges each being attached with a row of interlocking taps;

a bottom panel in a cap-like structure having a row of interlocking taps attached to the top edge thereof and a unitary side frame at one side, said side frame defining therein an elongated slot for mounting on said golf cart's main frame and having two spaced through-holes through which a screw and a pin are inserted to firmly secure said bottom panel to said golf cart's main frame; and wherein the interlocking taps on said two opposite end edges are joined with each other and the interlocking taps on said two opposite side edges are joined with the interlocking taps on said top panel and said bottom panel respectively so that said top, intermediate and bottom panels are connected into a golf bag.

* * * * *